United States Patent
Bühler

Patent Number: 5,474,579
Date of Patent: Dec. 12, 1995

[54] MIXTURES OF MONOAZO DYES

[75] Inventor: Ulrich Bühler, Alzenau, Germany

[73] Assignee: Hoechst Mitsubishi Kasei Co., Tokyo, Japan

[21] Appl. No.: 303,136

[22] Filed: Sep. 8, 1994

Related U.S. Application Data

[63] Continuation of Ser. No. 12,660, Feb. 3, 1993, abandoned.

[30] Foreign Application Priority Data

Feb. 14, 1992 [DE] Germany ............ 42 04 424.3

[51] Int. Cl.$^6$ ............... D06P 1/18; C09B 67/22
[52] U.S. Cl. ............... 8/639; 8/532; 8/918; 8/922
[58] Field of Search ............... 8/639, 532, 918

[56] References Cited

U.S. PATENT DOCUMENTS

| | | |
|---|---|---|
| 4,872,883 | 10/1989 | Buhler et al. |
| 4,960,434 | 10/1990 | Brierley et al. ............... 8/524 |
| 4,985,044 | 1/1991 | Hahnke . |

FOREIGN PATENT DOCUMENTS 0300626  1/1989  European Pat. Off. .

*Primary Examiner*—Johann Richter
*Assistant Examiner*—John Peabody
*Attorney, Agent, or Firm*—Connolly & Hutz

[57] ABSTRACT

The present invention relates to mixtures of monoazo dyes, characterised in that they comprise one or more dyes of the general formula I

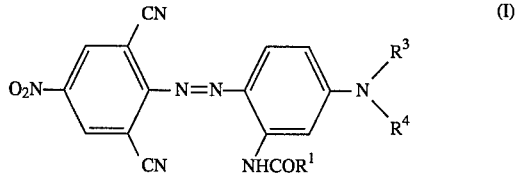

one or more dyes of the general formula II

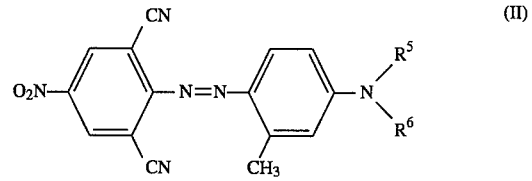

and one or more dyes of the general formula III

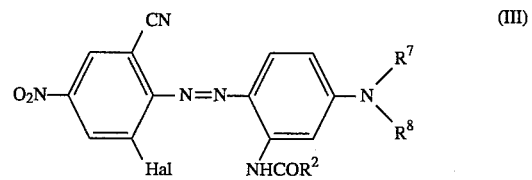

in which $R^1$ to $R^8$ independently of one another, are methyl, ethyl or n-propyl and $R^1$ and $R^2$ may each also be i-propyl and Hal is chlorine or bromine, processes for their preparation and their use for the dyeing and printing of hydrophobic synthetic fibre materials and blends thereof with natural fibre materials.

14 Claims, No Drawings

MIXTURES OF MONOAZO DYES

This application is a continuation, of application Ser. No. 08/012,660 filed Feb. 3, 1993, now abandoned.

The present invention relates to mixtures of monoazo dyes, processes for their preparation and their use for the dyeing and printing of hydrophobic synthetic fibre materials and blends thereof with natural fibre materials.

Dye mixtures similar to the ones according to the invention are already known and described, for example, in EP-A 277,529, DE-A 3,906,189 and EP-A 300,626. They have been developed with the aim of replacing anthraquinonoid blue dyes, such as, in particular, C.I. Disperse Blue 56, for economic and ecological reasons by azo dyes. Accordingly, their hue and in particular their brilliance should be as close as possible to those of the anthraquinone dye, they should have at least the same build-up, exhaust and levelling properties and ensure a sufficient safety margin with respect to pH, reducing influences and variations in temperature. Moreover, improved general use fastness properties, such as, for example, fastness to dry heat setting and wetfastness properties, are also desired. Finally, the metameric properties, i.e., the deviation in hue of a dyeing in artificial light compared with the hue in daylight, should correspond to those of C.I. Disperse Blue 56 as closely as possible or be as favourable as possible.

Surprisingly, it has now been found that the dye mixtures according to the invention come substantially closer in their properties to the anthraquinonoid Blue 56 than those previously disclosed in the literature.

The individual dyes of the dye mixtures according to the invention are already known and described, for example, in German Patent Specification 1,794,402, EP-B 36,512 and EP-A 324,409.

The present invention relates to mixtures of monoazo dyes, characterised in that they comprise one or more dyes of the general formula I

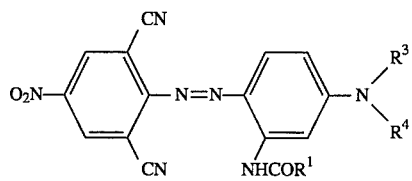

one or more dyes of the general formula II

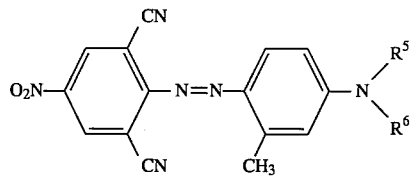

and one or more dyes of the general formula III

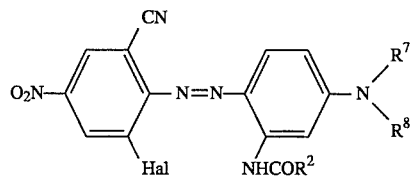

in which
$R^1$ to $R^8$ independently of one another, are methyl, ethyl or n-propyl and $R^1$ and $R^2$ may each also be i-propyl and Hal is chlorine or bromine.

Preferred dye mixtures according to the invention comprise one or more dyes each of the general formulae I to III. Particularly preferred dye mixtures according to the invention comprise one or two dyes of the general formula I and one dye each of the general formulae II and III. Preferred dye mixtures according to the invention are also those in which Hal represents bromine and those in which the radicals $R^3$ to $R^8$ represent n-propyl or in particular ethyl. In particular, it is preferred if $R^3$ and $R^4$ $R^5$ and $R^6$ and also $R^7$ and $R^8$ are in each case identical Particularly preferably, all radicals $R^3$ to $R^8$ are identical.

Furthermore, preference is given to dye mixtures according to the invention in which $R^1$/ $R^3$/$R^4$ are methyl/ethyl/ethyl, methyl/n-propyl/n-propyl, ethyl/ethyl/ethyl, n-propyl/ethyl/ethyl or i-propyl/ethyl/ethyl; $R^5$ and $R^6$ are ethyl; and Hal/$R^2$/ $R^7$/$R^8$ are bromine/methyl/ethyl/ethyl or bromine/ethyl/ethyl/ethyl.

In preferred dye mixtures according to the invention containing two dyes of the general formula I, the radicals $R^1$ $R^3$ and $R^4$ have the meanings methyl, ethyl, ethyl and n-propyl, ethyl, ethyl or the meanings methyl, ethyl, ethyl and methyl, n-propyl, n-propyl.

In the dye mixtures according to the invention, the ratio of the dyes of the general formulae I to III can vary. Preferably, the proportion of the dye or dyes of the general formula I is between 29 and 39% by weight, the proportion of the dye or dyes of the general formula II is between 36 and 46% by weight and the proportion of the dye or dyes of the general formula III is between 20 and 30% by weight.

Before dyeing, the dye mixtures according to the invention are finished, i.e., they are milled in the presence of water and dispersants in suitable mills, such as, for example, ball or sand mills, and, if it is desired to prepare a pulverulent dye, they are then spray-dried.

Examples of suitable dispersants are anionic or nonionic dispersants, which can also be used jointly.

Examples of anionic dispersants are condensation products of aromatic sulphonic acids with formaldehyde, in particular condensation products of alkylnaphthalenesulphonic acids with formaldehyde, condensation products of substituted or unsubstituted phenol with formaldehyde and sodium bisulphite, alkali metal salts of condensation products of substituted or unsubstituted phenol, naphthalene- or naphtholsulphonic acids, formaldehyde and sodium bisulphite, alkali metal salts of condensation products of substituted or unsubstituted phenolsulphonic acids, formaldehyde and urea and also alkali metal salts of lignosulphonic acids; alkyl- or alkylarylsulphonates, and alkylarylpolyglycol ether sulphates.

Examples of nonionic dispersants or emulsifiers are reaction products of alkylene oxides, such as, for example, ethylene oxide or propylene oxide, with alkylatable compounds, such as, for example, fatty alcohols, fatty amines, fatty acids, phenols, alkylphenols, arylalkylphenols, arylalkylarylphenols and carboxamides, such as, for example, adducts of 5 to 10 ethylene oxide units with $C_8$–$C_{10}$-alkylphenols.

Milling is carried out at temperatures of between 10 and 90° C., preferably at 30 to 60° C. During joint finishing of separately prepared individual components, joint milling at temperatures of more than 30° C. is advantageous. During milling, the dye particles are comminuted mechanically to such an extent that an optimum specific surface area is achieved and sedimentation of the dye is minimised. The particle sizes of the dyes are in general between 0.5 and 5 μ, preferably about 1 μ.

The dye mixtures according to the invention can be prepared by various processes, for example by mixing the separately prepared individual dyes, it being preferred to mix already finished individual dyes. This mixing process takes place in suitable mixers, such as, for example, tumbling mixers or stirrers. However, separately formulated individual dyes can also be mixed by stirring them into dye liquors.

In a preferred variant of this process, the dyes of the general formulae I and II are prepared by joint cyano exchange and, if desired, jointly formulated and then mixed with the separately prepared and formulated or unformulated dye or dyes of the general formula III. The joint cyano exchange is characterised in that in dye mixtures comprising at least one dye of the general formula IV and at least one dye of the general formula V

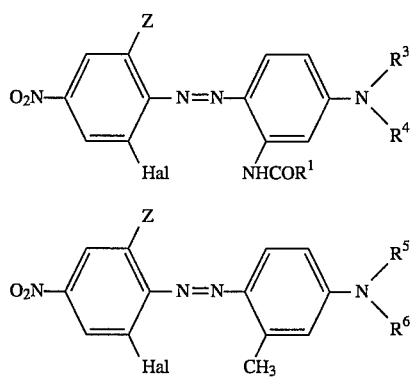

in which Z represents cyano or halogen and Hal represents halogen, preferably bromine, and $R^1$ and $R^3$ to $R^8$ have the abovementioned meanings, halogen is exchanged for cyano in a manner known per se, such as is described, for example, in British Patent Specification 1,125,685 for individual dyes. The composition of the mixture of the dyes of the general formulae IV and V is selected such that the desired mixing ratio is obtained.

Furthermore, dye mixtures according to the invention can be prepared by joint finishing of the separately prepared mixture components, i.e., by joint milling and/or spray-drying.

Preferably, the dye mixtures according to the invention are prepared in a heat treatment which is characterised in that the individual dyes are jointly heated at temperatures of 50 to 150° C. preferably 90 to 130° C. in water and, if desired, under pressure, for half an hour to several hours and cooled again. This heating advantageously takes place in the presence of one or more dispersants or an organic solvent. Examples of such solvents are methanol, ethanol, dimethylformamide or dimethyl sulphoxide, but preferably solvents which are sparingly soluble in water, such as toluene, chlorobenzene, 1,2-dichlorobenzene or butyl acetate. After the heat treatment, these solvents can be distilled off again. However, they can also be separated off by filtration, followed by washing the mixture with water. This preparation process can then be followed by finishing of the mixture.

Particularly preferably, the dye mixtures according to the invention are prepared by joint dissolution of the individual dyes in an organic solvent or solvent mixture, followed by crystallisation and/or precipitation, isolation, for example by filtration, and removal of solvent residues, for example by washing. This can also be followed by finishing of the mixture.

Preferred organic solvents are polar protic solvents, such as dimethylformamide, dimethyl sulphoxide or N-methylpyrrolidone. It is advantageous to completely dissolve the mixture component. In the case of less soluble mixture components, this can be achieved by increasing the amount of solvent, the dissolution temperature or the dissolution period. In order to save on amounts of solvent, dissolution advantageously takes place at an elevated temperature, it being possible to employ temperatures up to the boiling temperature of the particular solvent. If desired, the temperature can also be increased beyond that if superatmospheric pressure is employed.

For certain areas of application, powder formulations are preferred. These powders contain the dye, dispersants and other auxiliaries, such as, for example, wetting and oxidising agents, preservatives and dustproofing agents.

A preferred preparation process for pulverulent dye preparations consists in removing the liquid from the liquid dye dispersions described above, for example by vacuum drying, freeze drying, by drying on drum driers, but preferably by spray-drying.

The dye contents of the liquid dye formulations are 20 to 40%, the dispersant contents about 20 to 40%. In the case of powder formulations, the dye contents are 20 to 60% and the dispersant contents 40 to 80%. For economic reasons, the dye content in most cases does not fall below 20%.

The dye mixtures according to the invention are highly suitable as such or else in a mixture with other disperse dyes for the dyeing and printing of hydrophobic synthetic fibre materials and blends thereof with natural fibre materials.

Examples of suitable hydrophobic synthetic materials are: secondary cellulose acetate, cellulose triacetate, polyamides and in particular polyesters, such as, for example, polyethylene glycol terephthalate. Examples of natural fibre materials are cottons, regenerated cellulose fibres or wool.

The hydrophobic synthetic materials can be present in the form of sheet- or filament-like structures and have been processed, for example, to yarns or woven or knitted textile materials.

Dyeing of the fibre material mentioned by means of the dye mixtures according to the invention can take place in a manner known per se, preferably from an aqueous suspension, if desired in the presence of carriers, between 90 to about 110° C. by the exhaust method or by the HT process in a dyeing autoclave at 110 to 140° C. and by the so-called thermofix process, in which the goods are padded with the dye liquor and then fixed at about 180 to 230° C.

Printing of the materials mentioned can be carried out in a manner known per se such that the dye mixture according to the invention is incorporated in a printing paste and the goods printed therewith are then treated with HT steam, pressurised steam or dry heat, if appropriate in the presence of a carrier, at temperatures of between 90 and 230° C., in order to fix the dye.

In this manner, excellent blue dyeings or prints of very high brilliance and very good fastness properties are obtained. In the dye and padding liquors used in the above applications and the printing pastes, the dyes of the dye mixture according to the invention should be present as finely dispersed as possible. Fine dispersion of the dyes is carried out in a manner known per se by stirring the finished dye mixture, if desired together with dyeing assistants, such as, for example, levelling aids, into the dye or padding liquor. In order to prepare the dye liquors, the required amounts of dye formulations prepared according to the details given above are diluted with the dyeing medium, preferably with water, to such an extent that a liquor ratio of 5:1 to 50:1 is obtained for the dyeing. In addition, further dyeing assistants, such as dispersants, wetting agents and fixation aids, are in general added to the liquor. A pH of 4 to 5, preferably 4.5, is established by addition of organic and inorganic acids, such as acetic acid, succinic acid, boric acid or phosphoric acid. It is advantageous to buffer the pH obtained and to add a sufficient amount of a buffer system. An example of an advantageous buffer system is the system acetic acid/sodium acetate.

If the dye is to be used for textile printing, the required amounts of the dye formulations are kneaded in a manner known per se together with thickeners, such as, for example, alkali metal alginates or the like, and, if desired, further additives, such as, for example, fixation accelerators, wetting agents and oxidising agents, to give printing pastes.

EXAMPLE 1

10.0 g of the dye of the formula Ia

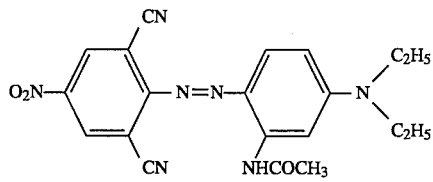

12.1 g of the dye of the formula IIa

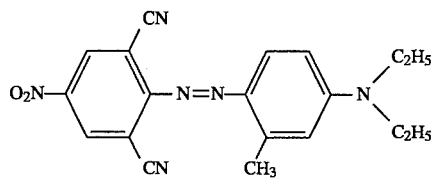

and 7.2 g of the dye of the formula IIIa

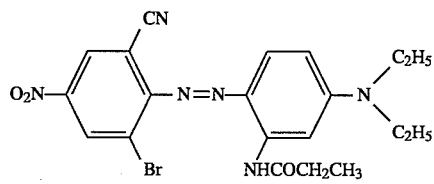

are homogenised together with 227.6 g of water, 86.8 g of a relatively high-molecular-weight lignosulphonate and 6.3 g of an arylpolyglycol ether by means of a dissolver disc, and the pH is brought to 8.0 with 2.6 ml of 50% acetic acid. This batch is then milled in a water-cooled bead mill to fine particles of <5 μ, the mill paste thus obtained is then screened to separate it off from the milling liquid, and then dried using a spraydrier.

1.25 g of the dye thus obtained are dispersed in 2000 g of water. 4 g of ammonium sulphate, 2 g of a commercially available dispersant based on a condensation product of sodium naphthalenesulphonate with formaldehyde and 2 g of a condensation product of m-cresol with formaldehyde and sodium sulphite are added to the dispersion, and the mixture is brought to a pH of 5.5 with acetic acid. The dye liquor thus obtained is entered with 100 g of a textured polyester fabric based on polyethylene glycol terephthalate, and the fabric is dyed at 120° C. for ½ an hour. After subsequent rinsing, reductive aftertreatment with a 0.2% sodium dithionite solution at 70 to 80° C. for 15 minutes, rinsing and drying, a blue dyeing of high colour strength and excellent colouristic properties is obtained.

If, to test the degree of exhaustion, a further 100 g swatch of a textured polyester fabric based on polyethylene terephthalate is put into the dyebath, held at 135° C. for 1 hour and aftertreated as indicated above for the actual dyeing, the exhaustion test swatch is found to be almost colourless.

EXAMPLE 2

11.0 g of the dye of the formula Ib

12.0 g of the dye of the formula IIa and 7.3 g of the dye of the formula IIIb

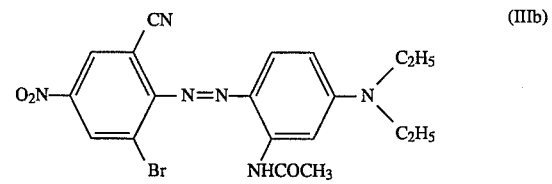

are jointly mixed in 243.7 g of water with 43.6 g of sodium lignosulphonate and 12.6 g of a nonionic dispersant based on arylpolyglycol ether (4-(4'-benzylphenyl)phenol+15 EO), the mixture is brought to a pH of 5.9 with 50% acetic acid and homogenised by means of a toothed-edge stirrer. The dispersion obtained is then heated in an autoclave to 100° C. over a period of 2 hours and stirred at this temperature for 2 hours. After cooling, 43.6 g of a condensation product of cresol with formaldehyde and sodium naphthol-2-sulphonate are added, and the dispersion is brought to a pH of 8.0 with 50% acetic acid. It is then milled at room temperature in a bead mill for 2 hours to fine particles (80% ≦1 μm), screened and dried in a spray-drier. The dye powder thus obtained is used for dyeing as follows.

0.12 g of the dye powder thus obtained are stirred into 250 ml of water, and 0.4 g of a commercially available dispersant based on a condensation product of m-cresol with formaldehyde and sodium sulphite, 0.8 g of a commercially available carrier based on methylnaphthalene, 0.8 g of crystalline sodium acetate and 1.2 ml of 30% acetic acid are added with stirring, and the mixture is made up to 400 ml with water. The pH of the dyebath is 4.5. This dyebath is entered with 10 g of a polyester fabric based on polyethylene glycol terephthalate. The fabric is dyed in an open tank at 95° C. for 90 minutes, the dyed material is removed, rinsed, subjected to a reductive aftertreatment with alkaline 0.2% sodium dithionite solution (15 minutes at 60 to 70° C.), rinsed again and dried. This gives a blue dyeing of high colour strength and excellent colouristic properties.

The exhaustion test swatch dyed at 135° C. for ½ an hour is almost colourless.

EXAMPLE 3

5.0 g of the dye of the formula Ia, 6.0 g of the dye of the formula Ib, 11.0 g of the dye of the formula IIa and 7.5 g of the dye of the formula IIIa are converted into a dye powder as described in Example 1.

0.12 g of the dye powder thus obtained are stirred into 200 ml of water, and 0.2 g of a commercially available dispersant based on a condensation product of m-cresol with formaldehyde and sodium sulphite, 0.3 g of a commercially available carrier based on methylnaphthalene, 0.4 g of crystalline sodium acetate and 1.2 ml of 30% acetic acid are added with stirring. The pH of the dyebath is 4.5. This dyebath is entered with 10 g of a polyester fabric based on polyethylene glycol terephthalate, and the fabric is dyed at 106° C. under pressure in a dyeing autoclave for 1 hour. As described above, dyeing is completed by rinsing, reductive aftertreatment, repeated rinsing and drying, likewise giving a blue dyeing of high colour strength and very good colouristic fastness properties.

The table below shows further dye mixtures according to the invention which can be prepared as described above and likewise produce on polyester materials blue dyeings or prints of high colour strength and likewise very good colouristic properties.

| general formula | $R^1$ or $R^2$ | $R^3,R^5$ or $R^7$ | $R^4,R^6$ or $R^8$ | Hal | mixing ratio |
|---|---|---|---|---|---|
| I | $CH_3$ | $C_2H_5$ | $C_2H_5$ | — | 33⅓ |
| II | — | $C_2H_5$ | $C_2H_5$ | — | 33⅓ |
| III | $C_2H_5$ | $C_2H_5$ | $C_2H_5$ | Br | 33⅓ |
| I | $nC_3H_7$ | $C_2H_5$ | $C_2H_5$ | — | 35 |
| II | — | $C_2H_5$ | $C_2H_5$ | — | 40 |
| III | $CH_3$ | $C_2H_5$ | $C_2H_5$ | Br | 25 |
| I | $CH_3$ | $C_2H_5$ | $C_2H_5$ | — | 20 |
| I | $nC_3H_7$ | $C_2H_5$ | $C_2H_5$ | — | 20 |
| II | — | $C_2H_5$ | $C_2H_5$ | — | 30 |
| III | $C_2H_5$ | $C_2H_5$ | $C_2H_5$ | Br | 30 |
| I | $CH_3$ | $C_2H_5$ | $C_2H_5$ | — | 29 |
| II | — | $C_2H_5$ | $C_2H_5$ | — | 46 |
| III | $CH_3$ | $C_2H_5$ | $C_2H_5$ | Br | 25 |
| I | $CH_3$ | $C_2H_5$ | $C_2H_5$ | — | 39 |
| II | — | $C_2H_5$ | $C_2H_5$ | — | 36 |
| III | $C_2H_5$ | $C_2H_5$ | $C_2H_5$ | Cl | 25 |
| I | $CH_3$ | $C_2H_5$ | $C_2H_5$ | — | 25 |
| II | — | $C_2H_5$ | $C_2H_5$ | — | 45 |
| III | $CH_3$ | $C_2H_5$ | $C_2H_5$ | Cl | 30 |
| I | $nC_3H_7$ | $C_2H_5$ | $C_2H_5$ | — | 33 |
| II | — | $C_2H_5$ | $C_2H_5$ | — | 42 |
| III | $C_2H_5$ | $C_2H_5$ | $C_2H_5$ | Br | 25 |
| I | $nC_3H_7$ | $C_2H_5$ | $C_2H_5$ | — | 35 |
| II | — | $C_2H_5$ | $C_2H_5$ | — | 35 |
| III | $C_2H_5$ | $C_2H_5$ | $C_2H_5$ | Cl | 30 |
| I | $CH_3$ | $nC_3H_7$ | $nC_3H_7$ | — | 33 |
| II | — | $C_2H_5$ | $C_2H_5$ | — | 36 |
| III | $C_2H_5$ | $C_2H_5$ | $C_2H_5$ | Br | 31 |
| I | $CH_3$ | $nC_3H_7$ | $nC_3H_7$ | — | 40 |
| II | — | $C_2H_5$ | $C_2H_5$ | — | 40 |
| III | $CH_3$ | $C_2H_5$ | $C_2H_5$ | Br | 20 |
| I | $CH_3$ | $nC_3H_7$ | $nC_3H_7$ | — | 25 |
| II | — | $C_2H_5$ | $C_2H_5$ | — | 50 |
| III | $CH_3$ | $C_2H_5$ | $C_2H_5$ | Cl | 25 |
| I | $C_2H_5$ | $C_2H_5$ | $C_2H_5$ | — | 50 |
| II | — | $C_2H_5$ | $C_2H_5$ | — | 25 |
| III | $C_2H_5$ | $C_2H_5$ | $C_2H_5$ | Br | 25 |
| I | $C_2H_5$ | $C_2H_5$ | $C_2H_5$ | — | 10 |
| II | — | $C_2H_5$ | $C_2H_5$ | — | 80 |
| III | $CH_3$ | $C_2H_5$ | $C_2H_5$ | Br | 10 |
| I | $C_2H_5$ | $C_2H_5$ | $C_2H_5$ | — | 35 |
| II | — | $C_2H_5$ | $C_2H_5$ | — | 34 |
| III | $C_2H_5$ | $C_2H_5$ | $C_2H_5$ | Cl | 31 |
| I | $iC_3H_7$ | $C_2H_5$ | $C_2H_5$ | — | 27 |
| II | — | $C_2H_5$ | $C_2H_5$ | — | 33 |
| III | $C_2H_5$ | $C_2H_5$ | $C_2H_5$ | Br | 30 |
| I | $iC_3H_7$ | $C_2H_5$ | $C_2H_5$ | — | 33⅓ |
| II | — | $C_2H_5$ | $C_2H_5$ | — | 33⅓ |
| III | $CH_3$ | $C_2H_5$ | $C_2H_5$ | Br | 33⅓ |
| I | $C_2H_5$ | $nC_3H_7$ | $nC_3H_7$ | — | 35 |
| II | — | $C_2H_5$ | $C_2H_5$ | — | 40 |
| III | $C_2H_5$ | $C_2H_5$ | $C_2H_5$ | Br | 25 |
| I | $C_2H_5$ | $C_2H_5$ | $nC_3H_7$ | — | 60 |
| II | — | $C_2H_5$ | $C_2H_5$ | — | 25 |
| III | $C_2H_5$ | $C_2H_5$ | $C_2H_5$ | Br | 15 |
| I | $CH_3$ | $C_2H_5$ | $C_2H_5$ | — | 15 |
| I | $nC_3H_7$ | $C_2H_5$ | $C_2H_5$ | — | 20 |
| II | — | $C_2H_5$ | $C_2H_5$ | — | 40 |
| III | $CH_3$ | $C_2H_5$ | $C_2H_5$ | Br | 25 |
| I | $CH_3$ | $C_2H_5$ | $C_2H_5$ | — | 10 |
| I | $nC_3H_7$ | $C_2H_5$ | $C_2H_5$ | — | 15 |
| II | — | $C_2H_5$ | $C_2H_5$ | — | 45 |
| III | $C_2H_5$ | $C_2H_5$ | $C_2H_5$ | Cl | 30 |
| I | $CH_3$ | $C_2H_5$ | $C_2H_5$ | — | 17 |
| I | $CH_3$ | $nC_3H_7$ | $nC_3H_7$ | — | 18 |
| II | — | $C_2H_5$ | $C_2H_5$ | — | 40 |
| III | $C_2H_5$ | $C_2H_5$ | $C_2H_5$ | Br | 25 |
| I | $CH_3$ | $C_2H_5$ | $C_2H_5$ | — | 25 |
| I | $CH_3$ | $nC_3H_7$ | $nC_3H_7$ | — | 25 |
| II | — | $C_2H_5$ | $C_2H_5$ | — | 30 |
| III | $CH_3$ | $C_2H_5$ | $C_2H_5$ | Br | 20 |
| I | $nC_3H_7$ | $C_2H_5$ | $C_2H_5$ | — | 15 |
| I | $iC_3H_7$ | $C_2H_5$ | $C_2H_5$ | — | 15 |
| II | — | $C_2H_5$ | $C_2H_5$ | — | 40 |
| III | $CH_3$ | $C_2H_5$ | $C_2H_5$ | Br | 30 |
| I | $CH_3$ | $C_2H_5$ | $C_2H_5$ | — | 25 |
| II | — | $C_2H_5$ | $C_2H_5$ | — | 45 |
| III | $C_2H_5$ | $nC_3H_7$ | $nC_3H_7$ | Br | 30 |
| I | $CH_3$ | $C_2H_5$ | $C_2H_5$ | — | 40 |
| II | — | $C_2H_5$ | $C_2H_5$ | — | 35 |
| III | $CH_3$ | $C_2H_5$ | $nC_3H_7$ | Br | 25 |
| I | $C_2H_5$ | $C_2H_5$ | $C_2H_5$ | — | 33 |
| II | — | $C_2H_5$ | $C_2H_5$ | — | 42 |
| III | $nC_3H_7$ | $C_2H_5$ | $C_2H_5$ | Br | 25 |
| I | $CH_3$ | $C_2H_5$ | $C_2H_5$ | — | 30 |
| II | — | $C_2H_5$ | $C_2H_5$ | — | 40 |
| III | $CH_3$ | $C_2H_5$ | $C_2H_5$ | Br | 15 |
| III | $C_2H_5$ | $C_2H_5$ | $C_2H_5$ | Br | 15 |
| I | $nC_3H_7$ | $C_2H_5$ | $C_2H_5$ | — | 25 |
| II | — | $C_2H_5$ | $C_2H_5$ | — | 40 |
| III | $CH_3$ | $C_2H_5$ | $C_2H_5$ | Br | 10 |
| III | $nC_3H_7$ | $C_2H_5$ | $C_2H_5$ | Br | 25 |
| I | $CH_3$ | $C_2H_5$ | $C_2H_5$ | — | 29 |
| II | — | $C_2H_5$ | $C_2H_5$ | — | 41 |
| III | $CH_3$ | $C_2H_5$ | $C_2H_5$ | Cl | 5 |
| III | $C_2H_5$ | $C_2H_5$ | $C_2H_5$ | Br | 25 |
| I | $CH_3$ | $C_2H_5$ | $C_2H_5$ | — | 30 |
| II | — | $nC_3H_7$ | $nC_3H_7$ | — | 45 |
| III | $C_2H_5$ | $C_2H_5$ | $C_2H_5$ | Br | 25 |
| I | $C_2H_5$ | $C_2H_5$ | $C_2H_5$ | — | 40 |
| II | — | $C_2H_5$ | $C_2H_5$ | — | 20 |
| III | $CH_3$ | $C_2H_5$ | $C_2H_5$ | Br | 40 |
| I | $nC_3H_7$ | $C_2H_5$ | $C_2H_5$ | — | 35 |
| II | — | $nC_3H_7$ | $nC_3H_7$ | — | 35 |
| III | $CH_3$ | $C_2H_5$ | $C_2H_5$ | Br | 30 |
| I | $CH_3$ | $nC_3H_7$ | $nC_3H_7$ | — | 30 |
| II | — | $C_2H_5$ | $C_2H_5$ | — | 20 |
| II | — | $nC_3H_7$ | $nC_3H_7$ | — | 25 |
| III | $C_2H_5$ | $C_2H_5$ | $C_2H_5$ | Br | 25 |

I claim:

1. Mixtures of monoazo dyes, comprising one or more dyes of the general formula I

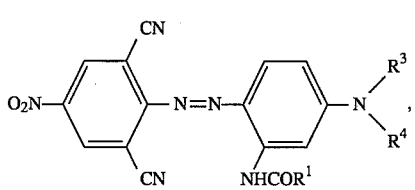

one or more dyes of the general formula II

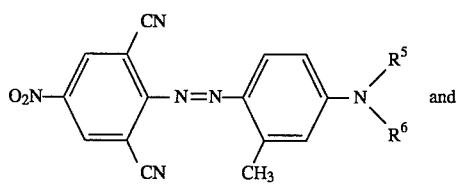

(II)

one or more dyes of the general formula III

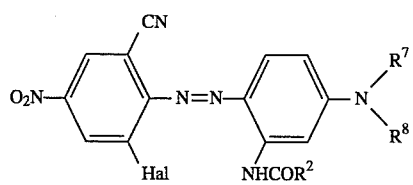

(III)

in which

R$^3$ to R$^8$, independently of one another, are methyl, ethyl or n-propyl and R$^1$ and R2, independently of one another, are methyl ethyl, n-propyl or i-propyl and Hal is chlorine or bromine.

2. The mixture according to claim 1, wherein said Hal is bromine.

3. The mixture according to claim 1, wherein all radicals R$^3$ and R$^8$ are identical and represent n-propyl or ethyl.

4. The mixture according to claim 2, wherein all radicals R$^3$ and R$^8$ are identical and represent n-propyl or ethyl.

5. The mixture according to claim 3, wherein all radicals R$^3$ arid R$^8$ are identical and represent ethyl.

6. The mixture according to claim 4, wherein all radicals R$^3$ and R$^8$ are identical and represent ethyl.

7. The mixture according to claim 1, wherein R$^1$/R$^3$/R$^4$ are methyl/ethyl/ethyl, methyl/n-propyl/n-propyl, ethyl/ethyl/ethyl, n-propyl/ethyl/ethyl or i-propyl/ethyl/ethyl; R$^5$ and R$^6$ are ethyl; and Hal/R$^2$/R$^7$/R$^8$ are bromine/methyl/ethyl/ethyl or bromine/ethyl/ethyl/ethyl.

8. The mixture according to claim 2, wherein R$^1$/R$^3$/R$^4$ are methyl/ethyl/ethyl, methyl/n-propyl/n-propyl, ethyl/ethyl/ethyl, n-propyl/ethyl/ethyl or i-propyl/ethyl/ethyl; R$^5$ and R$^6$ are ethyl; and Hal/R$^2$/R$^7$/R$^8$ are bromine/methyl/ethyl/ethyl or bromine/ethyl/ethyl/ethyl.

9. The mixture according to claim 4, wherein R$^1$/R$^3$/R$^4$ are methyl/ethyl/ethyl, methyl/n-propyl/n-propyl, ethyl/ethyl/ethyl, n-propyl/ethyl/ethyl or i-propyl/ethyl/ethyl; R$^5$ and R$^6$ are ethyl; and Hal/R$^2$/R$^7$/R$^8$ are bromine/methyl/ethyl/ethyl or bromine/ethyl/ethyl/ethyl.

10. The mixture according to claim 64, wherein R$^1$/R$^3$/R$^4$ are methyl/ethyl/ethyl, methyl/n-propyl/n-propyl, ethyl/ethyl/ethyl, n-propyl/ethyl/ethyl or i-propyl/ethyl/ethyl; R$^5$ and R$^6$ are ethyl; and Hal/R$^2$/R$^7$/R$^8$ are bromine/methyl/ethyl/ethyl or bromine/ethyl/ethyl/ethyl.

11. The mixture according claim 1, wherein two dyes of the general formula I in which the radicals R$^1$, R$^3$ and R$^4$ have the meanings methyl, ethyl, ethyl and n-propyl, ethyl, ethyl or the meanings methyl, ethyl, ethyl and methyl, n-propyl, n-propyl.

12. The mixture according claim 2, wherein two dyes of the general formula I in which the radicals R$^1$, R$^3$ and R$^4$ have the meanings methyl, ethyl, ethyl and n-propyl, ethyl, ethyl or the meanings methyl, ethyl, ethyl and methyl, n-propyl, n-propyl.

13. The mixture according claim 6, wherein two dyes of the general formula I in which the radicals R$^1$, R$^3$ and R$^4$ have the meanings methyl, ethyl, ethyl and n-propyl, ethyl, ethyl or the meanings methyl, ethyl, ethyl and methyl, n-propyl, n-propyl.

14. The mixture according claim 10, wherein two dyes of the general formula I in which the radicals R 1, R$^3$ and R$^4$ have the meanings methyl, ethyl, ethyl and n-propyl, ethyl, ethyl or the meanings methyl, ethyl, ethyl and methyl, n-propyl, n-propyl.

* * * * *

UNITED STATES PATENT AND TRADEMARK OFFICE
CERTIFICATE OF CORRECTION

PATENT NO.: 5,474,579

DATED: DECEMBER 12, 1995

INVENTOR(S): ULRICH BÜHLER

It is certified that error appears in the above-identified patent and that said Letters Patent is hereby corrected as shown below:

Column 2, line 9, after $R^4$, insert -- , --;

Column 2, line 10, after "identical" insert -- . --;

Column 2, line 18, after $R^1$, insert -- , --.

Column 3, line 31, "$R^8$" should be -- $R^6$ --;

The table at Column 7 line 17 through Col. 8, line 50 should read
--

| general formula | $R^1$ or $R^2$ | $R^3,R^5$ or $R^7$ | $R^4,R^6$ or $R^8$ | Hal | mixing ratio |
|---|---|---|---|---|---|
| I   | $CH_3$    | $C_2H_5$ | $C_2H_5$ | -  | 33 1/3 |
| II  | -         | $C_2H_5$ | $C_2H_5$ | -  | 33 1/3 |
| III | $C_2H_5$  | $C_2H_5$ | $C_2H_5$ | Br | 33 1/3 |
| I   | $nC_3H_7$ | $C_2H_5$ | $C_2H_5$ | -  | 35 |
| II  | -         | $C_2H_5$ | $C_2H_5$ | -  | 40 |
| III | $CH_3$    | $C_2H_5$ | $C_2H_5$ | Br | 25 |
| I   | $CH_3$    | $C_2H_5$ | $C_2H_5$ | -  | 20 |
| I   | $nC_3H_7$ | $C_2H_5$ | $C_2H_5$ | -  | 20 |
| II  | -         | $C_2H_5$ | $C_2H_5$ | -  | 30 |
| III | $C_2H_5$  | $C_2H_5$ | $C_2H_5$ | Br | 30 |

UNITED STATES PATENT AND TRADEMARK OFFICE
CERTIFICATE OF CORRECTION

PATENT NO.: 5,474,579

DATED: DECEMBER 12, 1995

INVENTOR(S): ULRICH BÜHLER

It is certified that error appears in the above-identified patent and that said Letters Patent is hereby corrected as shown below:

| | | | | | |
|---|---|---|---|---|---|
| I   | $CH_3$    | $C_2H_5$ | $C_2H_5$ | -  | 29 |
| II  | -         | $C_2H_5$ | $C_2H_5$ | -  | 46 |
| III | $CH_3$    | $C_2H_5$ | $C_2H_5$ | Br | 25 |
| I   | $CH_3$    | $C_2H_5$ | $C_2H_5$ | -  | 39 |
| II  | -         | $C_2H_5$ | $C_2H_5$ | -  | 36 |
| III | $C_2H_5$  | $C_2H_5$ | $C_2H_5$ | Cl | 25 |
| I   | $CH_3$    | $C_2H_5$ | $C_2H_5$ | -  | 25 |
| II  | -         | $C_2H_5$ | $C_2H_5$ | -  | 45 |
| III | $CH_3$    | $C_2H_5$ | $C_2H_5$ | Cl | 30 |
| I   | $nC_3H_7$ | $C_2H_5$ | $C_2H_5$ | -  | 33 |
| II  | -         | $C_2H_5$ | $C_2H_5$ | -  | 42 |
| III | $C_2H_5$  | $C_2H_5$ | $C_2H_5$ | Br | 25 |
| I   | $nC_3H_7$ | $C_2H_5$ | $C_2H_5$ | -  | 35 |
| II  | -         | $C_2H_5$ | $C_2H_5$ | -  | 35 |
| III | $C_2H_5$  | $C_2H_5$ | $C_2H_5$ | Cl | 30 |
| I   | $CH_3$    | $nC_3H_7$ | $nC_3H_7$ | - | 33 |
| II  | -         | $C_2H_5$  | $C_2H_5$  | - | 36 |
| III | $C_2H_5$  | $C_2H_5$  | $C_2H_5$  | Br | 31 |

UNITED STATES PATENT AND TRADEMARK OFFICE
CERTIFICATE OF CORRECTION

PATENT NO.: 5,474,579

Page 3 of 8

DATED: DECEMBER 12, 1995

INVENTOR(S): ULRICH BÜHLER

It is certified that error appears in the above-identified patent and that said Letters Patent is hereby corrected as shown below:

| | | | | | |
|---|---|---|---|---|---|
| I   | $CH_3$    | $nC_3H_7$ | $nC_3H_7$ | -  | 40 |
| II  | -         | $C_2H_5$  | $C_2H_5$  | -  | 40 |
| III | $CH_3$    | $C_2H_5$  | $C_2H_5$  | Br | 20 |
| I   | $CH_3$    | $nC_3H_7$ | $nC_3H_7$ | -  | 25 |
| II  | -         | $C_2H_5$  | $C_2H_5$  | -  | 50 |
| III | $CH_3$    | $C_2H_5$  | $C_2H_5$  | Cl | 25 |
| I   | $C_2H_5$  | $C_2H_5$  | $C_2H_5$  | -  | 50 |
| II  | -         | $C_2H_5$  | $C_2H_5$  | -  | 25 |
| III | $C_2H_5$  | $C_2H_5$  | $C_2H_5$  | Br | 25 |
| I   | $C_2H_5$  | $C_2H_5$  | $C_2H_5$  | -  | 10 |
| II  | -         | $C_2H_5$  | $C_2H_5$  | -  | 80 |
| III | $CH_3$    | $C_2H_5$  | $C_2H_5$  | Br | 10 |
| I   | $C_2H_5$  | $C_2H_5$  | $C_2H_5$  | -  | 35 |
| II  | -         | $C_2H_5$  | $C_2H_5$  | -  | 34 |
| III | $C_2H_5$  | $C_2H_5$  | $C_2H_5$  | Cl | 31 |
| I   | $iC_3H_7$ | $C_2H_5$  | $C_2H_5$  | -  | 27 |
| II  | -         | $C_2H_5$  | $C_2H_5$  | -  | 33 |
| III | $C_2H_5$  | $C_2H_5$  | $C_2H_5$  | Br | 30 |
| I   | $iC_3H_7$ | $C_2H_5$  | $C_2H_5$  | -  | 33 1/3 |
| II  | -         | $C_2H_5$  | $C_2H_5$  | -  | 33 1/3 |
| III | $CH_3$    | $C_2H_5$  | $C_2H_5$  | Br | 33 1/3 |

UNITED STATES PATENT AND TRADEMARK OFFICE
CERTIFICATE OF CORRECTION

PATENT NO.: 5,474,579

DATED: DECEMBER 12, 1995

INVENTOR(S): ULRICH BÜHLER

It is certified that error appears in the above-identified patent and that said Letters Patent is hereby corrected as shown below:

|     |           |           |           |     |    |
|-----|-----------|-----------|-----------|-----|----|
| I   | $C_2H_5$  | $nC_3H_7$ | $nC_3H_7$ | -   | 35 |
| II  | -         | $C_2H_5$  | $C_2H_5$  | -   | 40 |
| III | $C_2H_5$  | $C_2H_5$  | $C_2H_5$  | Br  | 25 |
|     |           |           |           |     |    |
| I   | $C_2H_5$  | $C_2H_5$  | $nC_3H_7$ | -   | 60 |
| II  | -         | $C_2H_5$  | $C_2H_5$  | -   | 25 |
| III | $C_2H_5$  | $C_2H_5$  | $C_2H_5$  | Br  | 15 |
|     |           |           |           |     |    |
| I   | $CH_3$    | $C_2H_5$  | $C_2H_5$  | -   | 15 |
| I   | $nC_3H_7$ | $C_2H_5$  | $C_2H_5$  | -   | 20 |
| II  | -         | $C_2H_5$  | $C_2H_5$  | -   | 40 |
| III | $CH_3$    | $C_2H_5$  | $C_2H_5$  | Br  | 25 |
|     |           |           |           |     |    |
| I   | $CH_3$    | $C_2H_5$  | $C_2H_5$  | -   | 10 |
| I   | $nC_3H_7$ | $C_2H_5$  | $C_2H_5$  | -   | 15 |
| II  | -         | $C_2H_5$  | $C_2H_5$  | -   | 45 |
| III | $C_2H_5$  | $C_2H_5$  | $C_2H_5$  | Cl  | 30 |
|     |           |           |           |     |    |
| I   | $CH_3$    | $C_2H_5$  | $C_2H_5$  | -   | 17 |
| I   | $CH_3$    | $nC_3H_7$ | $nC_3H_7$ | -   | 18 |
| II  | -         | $C_2H_5$  | $C_2H_5$  | -   | 40 |
| III | $C_2H_5$  | $C_2H_5$  | $C_2H_5$  | Br  | 25 |
|     |           |           |           |     |    |
| I   | $CH_3$    | $C_2H_5$  | $C_2H_5$  | -   | 25 |
| I   | $CH_3$    | $nC_3H_7$ | $nC_3H_7$ | -   | 25 |
| II  | -         | $C_2H_5$  | $C_2H_5$  | -   | 30 |
| III | $CH_3$    | $C_2H_5$  | $C_2H_5$  | Br  | 20 |

UNITED STATES PATENT AND TRADEMARK OFFICE
CERTIFICATE OF CORRECTION

PATENT NO.: 5,474,579

DATED: DECEMBER 12, 1995

INVENTOR(S): ULRICH BÜHLER

It is certified that error appears in the above-identified patent and that said Letters Patent is hereby corrected as shown below:

| | | | | | |
|---|---|---|---|---|---|
| I   | $nC_3H_7$ | $C_2H_5$ | $C_2H_5$ | -  | 15 |
| I   | $iC_3H_7$ | $C_2H_5$ | $C_2H_5$ | -  | 15 |
| II  | -         | $C_2H_5$ | $C_2H_5$ | -  | 40 |
| III | $CH_3$    | $C_2H_5$ | $C_2H_5$ | Br | 30 |
| I   | $CH_3$    | $C_2H_5$ | $C_2H_5$ | -  | 25 |
| II  | -         | $C_2H_5$ | $C_2H_5$ | -  | 45 |
| III | $C_2H_5$  | $nC_3H_7$| $nC_3H_7$| Br | 30 |
| I   | $CH_3$    | $C_2H_5$ | $C_2H_5$ | -  | 40 |
| II  | -         | $C_2H_5$ | $C_2H_5$ | -  | 35 |
| III | $CH_3$    | $C_2H_5$ | $nC_3H_7$| Br | 25 |
| I   | $C_2H_5$  | $C_2H_5$ | $C_2H_5$ | -  | 33 |
| II  | -         | $C_2H_5$ | $C_2H_5$ | -  | 42 |
| III | $nC_3H_7$ | $C_2H_5$ | $C_2H_5$ | Br | 25 |
| I   | $CH_3$    | $C_2H_5$ | $C_2H_5$ | -  | 30 |
| II  | -         | $C_2H_5$ | $C_2H_5$ | -  | 40 |
| III | $CH_3$    | $C_2H_5$ | $C_2H_5$ | Br | 15 |
| III | $C_2H_5$  | $C_2H_5$ | $C_2H_5$ | Br | 15 |
| I   | $nC_3H_7$ | $C_2H_5$ | $C_2H_5$ | -  | 25 |
| II  | -         | $C_2H_5$ | $C_2H_5$ | -  | 40 |
| III | $CH_3$    | $C_2H_5$ | $C_2H_5$ | Br | 10 |
| III | $nC_3H_7$ | $C_2H_5$ | $C_2H_5$ | Br | 25 |

UNITED STATES PATENT AND TRADEMARK OFFICE
CERTIFICATE OF CORRECTION

PATENT NO.: 5,474,579                                         Page 6 of 8

DATED:      DECEMBER 12, 1995

INVENTOR(S):  ULRICH BÜHLER

It is certified that error appears in the above-identified patent and that said Letters Patent is hereby corrected as shown below:

| | | | | | |
|---|---|---|---|---|---|
| I   | $CH_3$   | $C_2H_5$   | $C_2H_5$   | -  | 29 |
| II  | -        | $C_2H_5$   | $C_2H_5$   | -  | 41 |
| III | $CH_3$   | $C_2H_5$   | $C_2H_5$   | Cl | 5  |
| III | $C_2H_5$ | $C_2H_5$   | $C_2H_5$   | Br | 25 |
| I   | $CH_3$   | $C_2H_5$   | $C_2H_5$   | -  | 30 |
| II  | -        | $nC_3H_7$  | $nC_3H_7$  | -  | 45 |
| III | $C_2H_5$ | $C_2H_5$   | $C_2H_5$   | Br | 25 |

UNITED STATES PATENT AND TRADEMARK OFFICE
CERTIFICATE OF CORRECTION

PATENT NO.: 5,474,579

DATED: DECEMBER 12, 1995

INVENTOR(S): ULRICH BÜHLER

It is certified that error appears in the above-identified patent and that said Letters Patent is hereby corrected as shown below:

| | | | | | |
|---|---|---|---|---|---|
| I   | $C_2H_5$   | $C_2H_5$   | $C_2H_5$   | -  | 40 |
| II  | -          | $C_2H_5$   | $C_2H_5$   | -  | 20 |
| III | $CH_3$     | $C_2H_5$   | $C_2H_5$   | Br | 40 |
| I   | $nC_3H_7$  | $C_2H_5$   | $C_2H_5$   | -  | 35 |
| II  | -          | $nC_3H_7$  | $nC_3H_7$  | -  | 35 |
| III | $CH_3$     | $C_2H_5$   | $C_2H_5$   | Br | 30 |
| I   | $CH_3$     | $nC_3H_7$  | $nC_3H_7$  | -  | 30 |
| II  | -          | $C_2H_5$   | $C_2H_5$   | -  | 20 |
| II  | -          | $nC_3H_7$  | $nC_3H_7$  | -  | 25 |
| III | $C_2H_5$   | $C_2H_5$   | $C_2H_5$   | Br | 25 |

Column 9, line 21, "R2" should be -- $R^2$ --;

Column 9, line 22, after "methyl" insert -- , --;

Column 9, line 31, "arid" should be -- and --.

Column 10, line 11, "64" should be -- 6 --; and

UNITED STATES PATENT AND TRADEMARK OFFICE
CERTIFICATE OF CORRECTION

PATENT NO. : 5,474,579

DATED : December 12, 1995

INVENTOR(S) : Ulrich Buhler

It is certified that error appears in the above-indentified patent and that said Letters Patent is hereby corrected as shown below:

Column 10, line 33, "R 1" should be -- $R^1$ --.

Signed and Sealed this

Eighth Day of October, 1996

*Attest:*

BRUCE LEHMAN

*Attesting Officer*     *Commissioner of Patents and Trademarks*